(12) United States Patent
Grewal et al.

(10) Patent No.: US 12,143,527 B2
(45) Date of Patent: Nov. 12, 2024

(54) COMPUTER MESSAGING ANALYTICS SYSTEMS AND METHODS

(71) Applicant: Grey Wall Software LLC, New Haven, CT (US)

(72) Inventors: Sukh Grewal, New Haven, CT (US); Keith Basile, Cheshire, CT (US); Geoffrey Baum, Milford, CT (US); Daniel Dormont, Fairfield, CT (US); Tamas Simon, New Haven, CT (US)

(73) Assignee: GREY WALL SOFTWARE LLC, New Haven, CT (US)

( * ) Notice: Subject to any disclaimer, the term of this patent is extended or adjusted under 35 U.S.C. 154(b) by 19 days.

(21) Appl. No.: 16/796,578

(22) Filed: Feb. 20, 2020

(65) Prior Publication Data
US 2021/0266397 A1 Aug. 26, 2021

(51) Int. Cl.
*H04M 1/7243* (2021.01)
*G06F 40/289* (2020.01)
*G06N 20/00* (2019.01)
*G06Q 10/107* (2023.01)
*H04L 51/216* (2022.01)
*H04L 51/52* (2022.01)

(52) U.S. Cl.
CPC ........ *H04M 1/7243* (2021.01); *G06F 40/289* (2020.01); *G06N 20/00* (2019.01); *G06Q 10/107* (2013.01); *H04L 51/216* (2022.05); *H04L 51/52* (2022.05)

(58) Field of Classification Search
CPC ... H04M 1/7243; G06Q 10/107; H04L 51/16; H04L 51/32; H04L 51/216; H04L 51/52; H04L 51/42; G06N 20/00; G06F 40/289; G06F 40/211; G06F 40/30
See application file for complete search history.

(56) References Cited

U.S. PATENT DOCUMENTS

| | | | |
|---|---|---|---|
| 8,228,821 B2 | 7/2012 | Robinson et al. | |
| 8,819,145 B1 | 8/2014 | Gailloux et al. | |
| 9,215,194 B2 | 12/2015 | Shaffer et al. | |
| 9,690,441 B2 | 6/2017 | Kim et al. | |
| 10,204,105 B2 | 2/2019 | Yang et al. | |
| 11,128,715 B1 * | 9/2021 | Al Majid | H04L 67/306 |
| 2004/0088359 A1 | 5/2004 | Simpson | |

(Continued)

*Primary Examiner* — Daniel W Parcher
(74) *Attorney, Agent, or Firm* — Armstrong Teasdale LLP

(57) ABSTRACT

Described herein is a messaging analytics system for automatically capturing, analyzing, and displaying messaging data. The messaging analytics system includes a processor configured to: receive form definitions from an admin computer device; generate a form based on the form definitions; receive messaging data; extract, from the messaging data, the at least one messaging data element specified by the form definitions; store the at least one extracted messaging data element in the form; generate, the at least one type of messaging analytics specified in the form definitions; store the generated at least one type of messaging analytics in the form; generate, based on the at least one messaging data element and the at least one type of messaging analytics, the at least one messaging display specified in the form definitions; store the generated at least one messaging display in the form; and display the form on a user computing device.

20 Claims, 10 Drawing Sheets

(56) References Cited

U.S. PATENT DOCUMENTS

| | | | |
|---|---|---|---|
| 2009/0254840 A1* | 10/2009 | Churchill | H04L 51/04 |
| | | | 715/753 |
| 2010/0004959 A1* | 1/2010 | Weingrad | G06Q 10/00 |
| | | | 705/5 |
| 2011/0238762 A1* | 9/2011 | Soni | H04W 4/029 |
| | | | 709/206 |
| 2011/0302117 A1* | 12/2011 | Pinckney | G06N 20/00 |
| | | | 706/12 |
| 2013/0204946 A1* | 8/2013 | Forstall | G06F 3/0482 |
| | | | 709/206 |
| 2015/0281156 A1* | 10/2015 | Beausoleil | H04L 51/12 |
| | | | 709/206 |
| 2016/0103914 A1* | 4/2016 | Im | G06F 16/2455 |
| | | | 707/770 |
| 2017/0024089 A1* | 1/2017 | Wang | G06F 3/04845 |
| 2017/0134335 A1* | 5/2017 | Goldstein | H04L 51/38 |
| 2017/0180294 A1* | 6/2017 | Milligan | H04L 51/02 |
| 2017/0220209 A1* | 8/2017 | Bae | G06Q 30/02 |
| 2017/0235739 A1* | 8/2017 | Yang | G06F 3/0481 |
| | | | 715/781 |
| 2019/0140995 A1* | 5/2019 | Roller | G06F 40/295 |
| 2019/0212879 A1* | 7/2019 | Anand | G06F 16/9024 |

\* cited by examiner

FIG. 3

COMPUTER MESSAGING ANALYTICS SYSTEMS AND METHODS

BACKGROUND

The present disclosure relates generally to messaging systems, and more specifically to computer-based systems and methods for providing enhanced messaging storage and analytics.

Current messaging systems may utilize chat streams to display a series of related messages to a user. Specifically, messages within a particular chat stream are often displayed chronologically with the author of each message also displayed. While the chat streams displayed by current messaging systems often make it simple for users to view and understand individual conversations, additional functionalities related to messaging data are limited. For example, at least some known systems lack built-in messaging analytics capabilities, making it difficult for users to view, generate, or understand advanced analytics associated with their messages. Further, at least some known systems lack additional messaging views other than a traditional chat stream view.

Accordingly, a system is needed that captures messaging data, generates messaging analytics and additional messaging displays, and stores data in a single data structure for improved user-accessibility.

BRIEF DESCRIPTION

The present embodiments may relate to systems and methods for automatically capturing, analyzing, and displaying messaging data. The system may include a messaging analytics ("MA") computer device, a messaging network, an admin computer device, a user computer device, and a third party computer device.

In one aspect, a messaging analytics system for automatically capturing, analyzing, and displaying messaging data is provided. The messaging analytics system includes at least one processor in communication with at least one memory device. The at least one processor is programmed to: (i) receive form definitions from an admin computer device, wherein the form definitions include at least one messaging data element to capture, at least one type of messaging analytics to generate, and at least one messaging display to generate: (ii) generate a form based on the form definitions, wherein the form is a data structure configured to store, analyze, and display a plurality of types of data: (iii) receive messaging data, wherein the messaging data is associated with messages sent between at least two user computer devices: (iv) extract, from the messaging data, the at least one messaging data element specified by the form definitions: (v) store the at least one extracted messaging data element in the form: (vi) generate, based on the at least one messaging data element stored in the form, the at least one type of messaging analytics specified in the form definitions: (vii) store the generated at least one type of messaging analytics in the form: (viii) generate, based on the at least one messaging data element and the at least one type of messaging analytics stored in the form, the at least one messaging display specified in the form definitions: (ix) store the generated at least one messaging display in the form; and (x) display the form on a user computing device, wherein displaying the form includes displaying at least one of the at least one messaging data element, the at least one type of messaging analytics, and the at least one messaging display.

In another aspect, a computer-implemented method for automatically capturing, analyzing, and displaying messaging data is provided. The method is implemented by a computer system including at least one processor. The method includes: (i) receiving, by the processor, form definitions from an admin computer device, wherein the form definitions include at least one messaging data element to capture, at least one type of messaging analytics to generate, and at least one messaging display to generate: (ii) generating, by the processor, a form based on the form definitions, wherein the form is a data structure configured to store, analyze, and display a plurality of types of data: (iii) receiving, by the processor, messaging data, wherein the messaging data is associated with messages sent between at least two user computer devices: (iv) extracting, by the processor from the messaging data, the at least one messaging data element specified by the form definitions: (v) storing, by the processor, the at least one extracted messaging data element in the form: (vi) generating, by the processor based on the at least one messaging data element stored in the form, the at least one type of messaging analytics specified in the form definitions: (vii) storing, by the processor, the generated at least one type of messaging analytics in the form: (viii) generating, by the processor based on the at least one messaging data element and the at least one type of messaging analytics stored in the form, the at least one messaging display specified in the form definitions; (ix) storing, by the processor, the generated at least one messaging display in the form; and (x) displaying, by the processor, the form on a user computing device, wherein displaying the form includes displaying at least one of the at least one messaging data element, the at least one type of messaging analytics, and the at least one messaging display.

In another aspect, at least one non-transitory computer-readable storage media having computer-executable instructions embodied thereon for automatically capturing, analyzing, and displaying messaging data is provided. When executed by at least one processor, the computer-executable instructions cause the processor to: (i) receive form definitions from an admin computer device, wherein the form definitions include at least one messaging data element to capture, at least one type of messaging analytics to generate, and at least one messaging display to generate: (ii) generate a form based on the form definitions, wherein the form is a data structure configured to store, analyze, and display a plurality of types of data: (iii) receive messaging data, wherein the messaging data is associated with messages sent between at least two user computer devices: (iv) extract, from the messaging data, the at least one messaging data element specified by the form definitions: (v) store the at least one extracted messaging data element in the form: (vi) generate, based on the at least one messaging data element stored in the form, the at least one type of messaging analytics specified in the form definitions: (vii) store the generated at least one type of messaging analytics in the form: (viii) generate, based on the at least one messaging data element and the at least one type of messaging analytics stored in the form, the at least one messaging display specified in the form definitions; (ix) store the generated at least one messaging display in the form; and (x) display the form on a user computing device, wherein displaying the form includes displaying at least one of the at least one messaging data element, the at least one type of messaging analytics, and the at least one messaging display.

BRIEF DESCRIPTION OF THE DRAWINGS

FIGS. 1-10 show example embodiments, of the methods and systems described herein.

FIG. 1 illustrates an example block diagram of a messaging analytics ("MA") computer system including a messaging analytics ("MA") computing device.

FIG. 2 illustrates an example data flow using the MA computer system of FIG. 1.

FIG. 3 illustrates a tabular data view of a form displayed to a user of the MA computer system of FIG. 1.

FIG. 4 illustrates a map view of a form displayed to a user of the MA computer system of FIG. 1.

FIG. 5 illustrates a calendar view of a form displayed to a user of the MA computer system of FIG. 1.

FIG. 6 illustrates a card wall view of a form displayed to a user of the MA computer system of FIG. 1.

FIG. 7 illustrates a schematic diagram of an user computing device, such as a user computing device that may be included in the MA computing system of FIG. 1.

FIG. 8 illustrates a schematic diagram of a server computing device, such as the MA computing device of FIG. 1.

FIG. 9 illustrates a diagram of a computer device and internal components, such as those that may be found in the MA computing device of FIG. 1.

FIG. 10 illustrates a flow chart of a method for capturing and analyzing messaging data using the MA computing device of FIG. 1.

DETAILED DESCRIPTION OF THE DISCLOSURE

Figure 1:
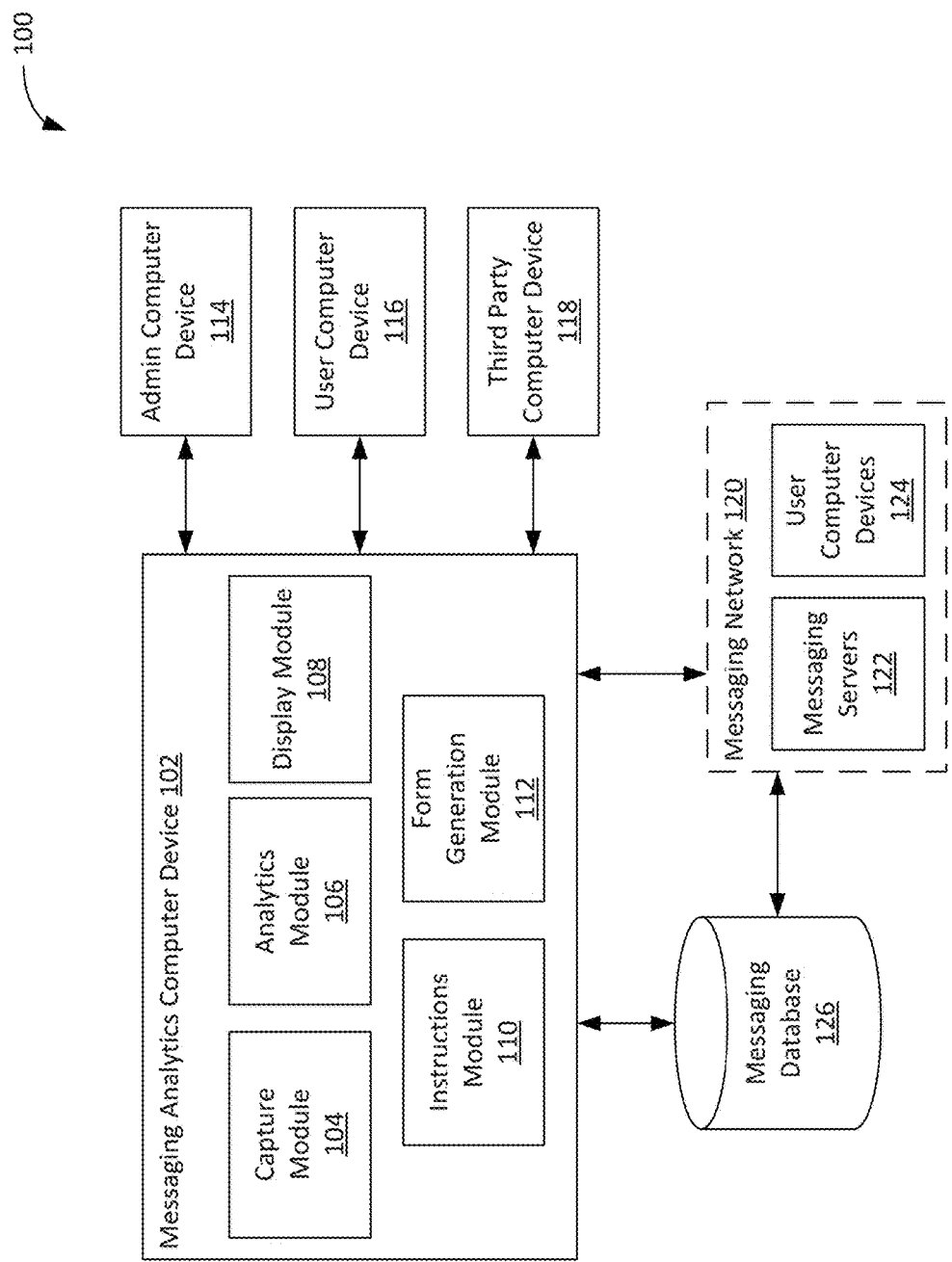

Embodiments of the present disclosure relate generally to capturing and analyzing messaging data. More particularly, the present disclosure relates to a computer system, referred to herein as an messaging analytics (MA) computer system, that captures messaging data in a specific data structure referred to herein as a "form", analyzes the messaging data in the form, enables multiple messaging displays for viewing and interacting with form data, and generates computer instructions based on analysis of the form data.

In the example embodiment, the systems and methods described herein are implemented using the MA computer system, which includes a messaging analytics ("MA") computer device. The MA computer device is configured to utilize modules such as a capture module, analytics module, display module, instructions module, and form generation module. The MA computer system further includes an admin computer device, a user computer device, a third party computer device, a messaging network, and a messaging database, each of which is in communication with the MA computer device. In alternative embodiments, the MA computer system includes any number of the aforementioned components in any combination in communication with the MA computer device. In alternative embodiments, any of the components may perform the tasks and functionalities of the other components as described herein.

In the example embodiment, the MA computer device is configured to create a "form" data structure for enabling the capture, analysis, and display of messaging data. A form is a data structure, or combination of data structures, that organizes messaging data such that messaging analytics may be readily processed and alternative messaging displays for viewing and interacting with the form data may be readily generated, as described further herein. For example, a single form may hold tabular data related to a plurality of messages, a messaging display for viewing the messages in a "chat stream" display, a messaging display for viewing the messages in a "calendar" display, and charts illustrating analytics generated from the messaging data. In other words, a single form may store messaging data in any form (e.g., tabular), messaging analytics data generated from the messaging data (e.g., frequency of messages or keyword analysis), and messaging displays for visualizing and interact with the messaging data and/or messaging analytics data (e.g., messaging displays such as chat stream, calendar, or bar graph).

In the example embodiment, the MA computer device is configured to generate a form data structure based on inputs from a user. In one embodiment, the MA computer device receives form definitions from an admin computer device, where the form definitions are based on user input received by the admin computer device from a user. In other words, the MA computer device is configured to generate different types of forms that may capture, analyze, or display data differently, based on inputs from a user.

In the example embodiment, the MA computer device is configured to receive messaging data from the messaging network and capture the messaging data in a form. The messaging network may include messaging servers containing messaging data and/or user computer devices between which messaging data is transmitted. As used herein, "messaging data" refers to any data or information associated with a message sent or stored within the messaging network, which may include, but is not limited to: messaging elements such as message text, numbers, images, links, videos, geographic information, emojis, and any meta-data associated with the message such as author, recipient(s), time and date sent, location of author, location of recipient(s), a project or thread or group with which the message is associated, category assigned to a message, description of image or video elements, keywords, and image recognition outputs, among other pieces of information. For example, multiple users may be sending messages between devices on a messaging network. As messages are sent, the MA computer device may access the messaging network, capture the messaging data, and populate a form with the messaging data.

In the example embodiment, the MA computer device is further configured to store the messaging data in a form. In one embodiment, the MA computer device stores the messaging data in the form as tabular data. The form is further configured to allow various displays of the messaging data. For example, the form enables the messaging data to be viewed as tabular data or as a "chat stream" based on the collected messaging data (described in more detail below).

In the example embodiment, the MA computer device is further configured to analyze the data in the form, generate messaging analytics data, and store the messaging analytics data in the form. Specifically, the MA computer device may analyze messaging data and determine metrics associated with the messaging data such as, but not limited to: frequency, relative frequency, total, percentage of total, and trends of a number of messages, message content, keywords, user commands, locations, dates, projects, and conversation threads, organized by user, project, date, time, keyword, location, and/or conversation thread, or any combination thereof. The form data structure enables performing analytics on a large amount of messaging data, and messaging analytics data may further be stored as data points within the form.

In one embodiment, the MA computer device receives form definitions that include analytics parameters defined by a user, such that certain analytics are automatically determined by the MA computer device when messaging data is captured in the form. For example, the MA computer device may capture messaging data in a form, calculate a frequency of messages sent per day for each user, and store the frequency calculation in the form. Similarly, the MA computer device may determine and store a frequency of messages sent per day related to a particular project. In another example, the MA computer device identifies all messages containing a keyword such as "email" and flags these messages (e.g., by adding a flag or alert associated with the message in the form).

In the example embodiment, the MA computer device is further configured to generate messaging displays based on messaging data and messaging analytics data. Specifically, after capturing the messaging data in a form, the MA computer device analyzes the messaging data and generates messaging displays based on the messaging data and/or messaging analytics data. For example, the MA computer device may display messaging analytics data in a graphical display, such that the number of messages sent by each user over a period of time is displayed in a bar graph. In another example, the MA computer device may display messaging analytics data in a calendar display, such that a number of messages sent each day by each user is displayed on a calendar.

In alternative embodiments, the MA computer device generates messaging displays based on messaging data, messaging analytics data, or both. In other words, in some embodiments MA computer device may generate messaging displays based on messaging data without generating specific messaging analytics data prior to generating the messaging displays. In one embodiment, messaging analytics data includes calculations of messaging frequency, keyword frequency, or other analytics metrics, and the MA computer device utilizes the analytics data to more effectively generate additional messaging displays. For example, the MA computer device may analyze the messaging data and determine how many times a keyword was used in a messaging thread, and the MA computer device may display the frequency of the keyword use each day on a calendar display.

In the example embodiment, the MA computer device is further configured to generate operation instructions based on the form. Specifically, the MA computer device is configured to analyze the messaging data and/or messaging analytics data, determine actions that should be carried out based on the analysis, and carry out the actions, generate instructions for carrying out the actions, and/or request user input before carrying out the actions. For example, the MA computer device may analyze form data that includes the text "we're out of bread", assign a meaning to the text, and determine that more bread needs to be ordered. The MA computer device may request user input on whether the user would like to order more bread and the date which the user would like to submit the order for more bread. The MA computer device may further generate and transmit instructions (e.g., an online order) to a third party computer device for ordering more bread based on the user input. As another example, the MA computer device may analyze messaging analytics data that indicates a number of messages related to a specific project is above a threshold, determine that a meeting needs to be scheduled to discuss the project, and generate and transmit instructions to an internal server to schedule a meeting on team members' calendars.

In the example embodiment, storing messaging data in a form data structure by the MA computer device enables integration of messaging analytics with captured message data and allows for seamless transitions between different displays or views of the messaging data and messaging analytics data. In one embodiment, capturing messaging data in a form by the MA computer device allows for the capture and analysis of relevant data from a message stream, expedient availability of additional views for messaging data (e.g., tabular view, chat stream view, calendar view, etc.), as well as messaging analytics and machine learning algorithms that enable actions and instructions to be generated based on the messaging data and analytics data captured. In one example, an MA computer device captures a stream of messages into a form, and, once the data is captured, the MA computer device may display the messaging data as a message stream or as tabular data. Additionally, the MA computer device may apply pre-determined analytics may to the messaging data to determine a project associated with the messages, as well as a list of notable recipients and authors. Further, the MA computer device may analyze message text for dates, times, and action-related keywords and determine a list of actions with associated dates and times. The MA computer device may utilize the messaging data and messaging analytics data in order to generate, for example, a Gantt Chart that graphs the determined actions, associates an individual responsible to each action, and places a deadline for completion of each action.

The methods and systems described herein may be implemented using computer programming or engineering techniques including computer software, firmware, hardware or any combination or subset thereof, wherein the technical effects may be achieved by performing the computer operations described herein, which may include, but are not limited to, the following steps: (i) receiving form definitions from an admin computer device, wherein the form definitions include at least one messaging data element to capture, at least one type of messaging analytics to generate, and at least one messaging display to generate: (ii) generating, by the processor, a form based on the form definitions, wherein the form is a data structure configured to store, analyze, and display a plurality of types of data; (iii) receiving, by the processor, messaging data, wherein the messaging data is associated with messages sent between at least two user computer devices: (iv) extracting, by the processor from the messaging data, the at least one messaging data element specified by the form definitions: (v) storing, by the processor, the at least one extracted messaging data element in the form: (vi) generating, by the processor based on the at least one messaging data element stored in the form, the at least one type of messaging analytics specified in the form definitions: (vii) storing, by the processor, the generated at least one type of messaging analytics in the form: (viii) generating, by the processor based on the at least one messaging data element and the at least one type of messaging analytics stored in the form, the at least one messaging display specified in the form definitions: (ix) storing, by the processor, the generated at least one messaging display in the form; and (x) displaying, by the processor, the form on a user computing device, wherein displaying the form includes displaying at least one of the at least one messaging data element, the at least one type of messaging analytics, and the at least one messaging display.

The technical benefits achieved by the methods and systems described herein include: (a) efficient storage of messaging data, messaging analytics data, messaging displays, and operations instructions within a single data structure; (b) expedited, automatic analysis of messaging data, not necessarily requiring user input: (c) convenient, readily available additional views of messaging data: (d) automated implementation of tasks suggested by users in text messages; and (e) automated conversion between data types (e.g., messaging data and messaging displays), thereby providing enhanced convenience for a user by enabling display visualizations that suit a user's needs.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California: IBM is a registered trademark of International Business Machines Corporation, Armonk, New York: Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The system is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 illustrates a block diagram of a messaging analytics ("MA") computer system 100 for capturing and analyzing messaging data using a form. MA computer system 100 includes a messaging analytics ("MA") computer device 102, which is configured to utilize modules such as a capture module 104, an analytics module 106, a display module 108, an instructions module 110, and a form generation module 112 to enable some or all of the functionalities described herein. In alternative embodiments, MA computer device 102 utilizes any number of the referenced modules in any combination, and may further utilize additional modules or no modules at all.

In the example embodiment, MA computer device 102 is in communication with an admin computer device 114, a user computer device 116, third party computer device 118, messaging network 120, which includes messaging servers 122 and user computer devices 124, and messaging database 126. In alternative embodiments, MA computer system 100 may include any of the aforementioned components in any combination in communication with MA computer device 102.

In the example embodiment, MA computer device 102 is configured to generate a form data structure, capture messaging data in the form, analyze the messaging data, generate messaging displays, and generate operation instructions based on the form data, as described in more detail below. Form generation module 112 is configured to receive form definitions and generate a form based on the form definitions. Capture module 104 is configured to capture messaging data in the form, for example by extracting messaging data from a thread of messages on messaging network 120. Analytics module 106 is configured to analyze the messaging data, generate messaging analytics, and store the messaging analytics in the form. Display module 108 is configured to utilize the messaging data and the messaging analytics data to generate messaging displays representing various aspects of the data stored in the form. Instructions module 110 is configured to utilize trained machine learning models to generate operations instructions based on analyzing messaging data and messaging analytics data. Module operations are described in more detail with reference to FIG. 2 below.

In the example embodiment, MA computer device 102 is configured to communicate with admin computer device 114. Admin computer device 114 may be any computer device capable of communicating with MA computer device 102 and enabling a user or administrator to access MA computer device 102. In one embodiment, MA computer device 102 receives administrative inputs from admin computer device 114, such as settings, preferences, and software updates, among other things. In the example embodiment, MA computer device 102 receives form definitions (e.g., input for defining forms) from admin computer device 114. In other words, a user may log in to admin computer device 114 in order to define a form to be used by MA computer device 102 for capturing and analyzing messaging data. In alternative embodiments, MA computer device 102 is in communication with any number of admin computer devices 112.

In the example embodiment, MA computer device 102 is configured to communicate with user computer device 116.

User computer device 116 may be any computer device capable of communicating with MA computer device 102 and enabling a user to access MA computer device 102. In one embodiment, user computer device 116 is a computer device such as a desktop computer, laptop, smartphone, or tablet that enables a user to access forms and form data through MA computer device 102. For example, a user may log in to an application through user computer device 116 that connects user computer device 116 to MA computer device 102. MA computer device 102 may then display forms, form data, and/or messaging displays through user computer device 116 such that the user may interact with the forms. In another embodiment, MA computer device 102 receives messaging data from user computer device 116 for capturing in a form. In alternative embodiments, MA computer device 102 is in communication with any number of user computer devices 114.

In the example embodiment, MA computer device 102 is configured to communicate with third party computer device 118. Third party computer device 118 includes any server or computer device that is operated by a third party. In alternative embodiments, third party computer device 118 is a server controlled by a third-party entity, such as, but not limited to, an email provider, a website or application administrator, a scheduling service, or an online marketplace, among others. In the example embodiment, MA computer device 102 is configured to send operations instructions to third party computer device 118, such that third party computer device 118 implements the operations instructions. In other words, MA computer device 102 is configured to generate and transmit computer-executable instructions that cause third party computer device 118 to implement some action as defined in the instructions. For example, third party computer device 118 may be an email provider, and MA computer device 102 may send instructions that cause the email provider to send an email to a group of individuals. In alternative embodiments, MA computer device 102 is in communication with any number of third party servers 116.

In the example embodiment, MA computer device 102 is further configured to communicate with messaging network 120. Messaging network 120 includes at least one of messaging server 122 and user computer device 122. In some embodiments, messaging network 120 includes a plurality of messaging servers 122 and/or user computer devices 124. In one embodiment, messaging server 122 tracks and manages data sent between a plurality of user computer devices 124, such that messages between multiple user computer devices 124 are routed through messaging server 122. MA computer device 102 is configured to receive messaging data from messaging network 120. In alternative embodiments, MA computer device 102 receives messaging data stored on messaging servers 122, messaging data transmitted between a plurality of user computer devices 124, or both. For example, messaging network 120 may serve as the messaging network for employees at a company. Employees may utilize user computer devices to send messages to each other, with each message routed through a messaging server. MA computer device 102 may receive messaging data from the messaging network by accessing the messaging server or by receiving messaging data directly from the user computer devices.

In the example embodiment, MA computer device 102 is configured to communicate with messaging database 126. Messaging database 126 may store any of the data described herein, including, but not limited to, forms, messaging data, messaging analytics data, messaging displays, operations instructions, form definitions, user inputs, training data, machine learning inputs, machine learning outputs, machine learning methods and algorithms, and trained and/or untrained machine learning models. MA computer device 102 is configured to receive data from messaging database 126 as necessary to enable the functionalities of the MA computer system 100 as described herein. MA computer device 102 is further configured to store any of the data described herein in messaging database 126. In alternative embodiments, messaging database 126 may be local to MA computer device 102 or may be remotely accessed through a database server.

Figure 2:
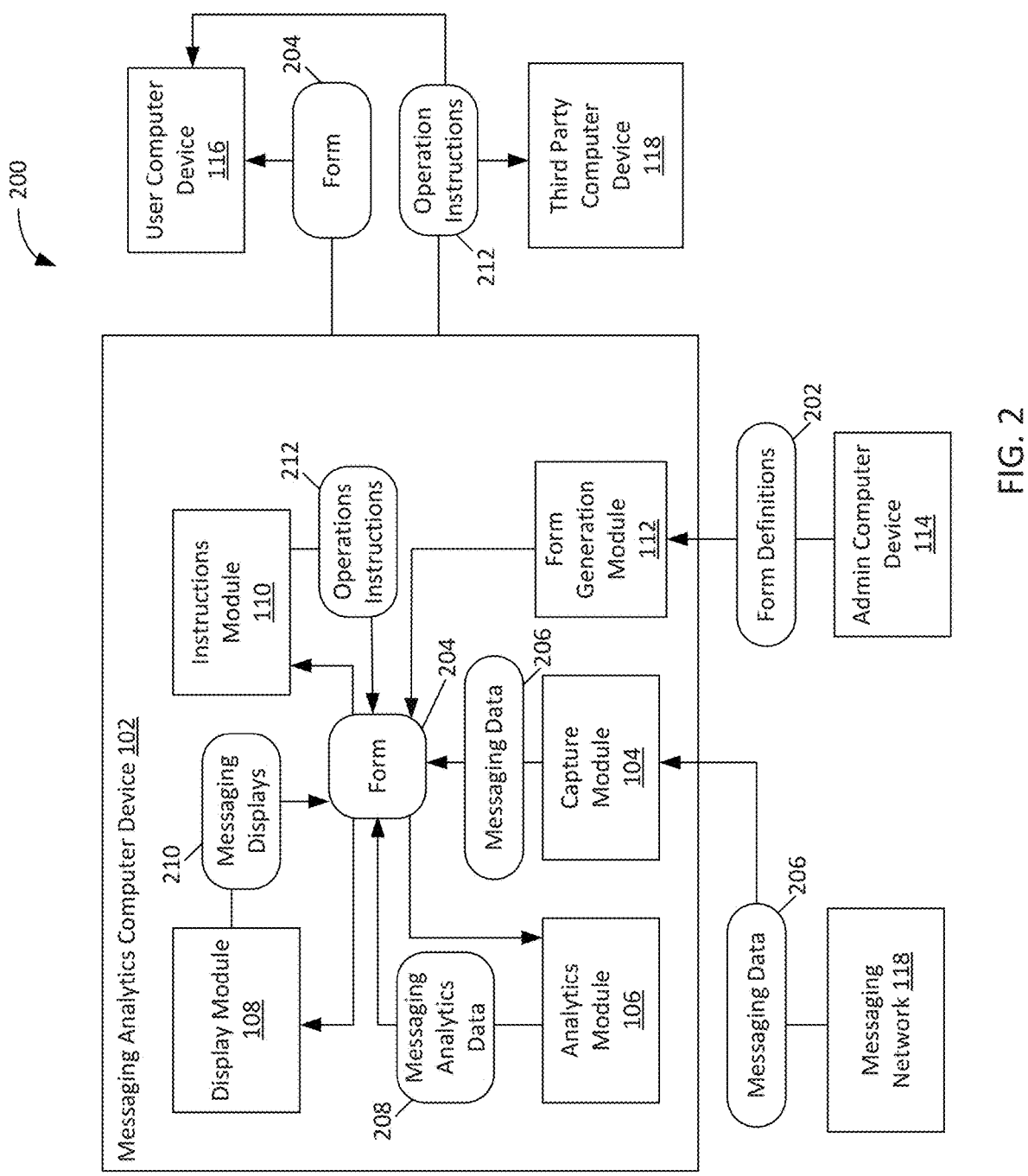

FIG. 2 illustrates an example data flow 200 using MA computer system 100 (shown in FIG. 1). In the example embodiment, MA computer device 102 receives form definitions 202 from admin computer device 114, and form generation module 112 generates form 204 based on form definitions 202. MA computer device 102 further receives messaging data 206 from messaging network 120, and capture module 104 captures messaging data 206 in a form 204. Analytics module 106 is configured to receive form 204, generate message analytics data 208 based on the data in form 204, and store message analytics data 208 in form 204. Display module 108 is configured to receive form 204, generate a messaging display 210 based on the data in form 204, and store messaging display 210 in form 204. Instructions module 110 is configured to receive form 204, generate operation instructions 212 based on the data in form 204, and store operation instructions 212 in form 204. Additionally, MA computer device 102 is configured to transmit form 204 to user computer device 116 and operation instructions 212 to third party computer device 118 or user computer device 116.

In the example embodiment, MA computer device 102 receives form definitions 202 from admin computer device 114. Form definitions 202 may include any computer code, instructions, or data that provides parameters for defining form 204. Specifically, MA computer device 102 receives form definitions 202 and utilizes form generation module 112 to generate form 204 based on form definitions 202. For example, form definitions 202 may include a list of data fields to include in form 204, such as "author", "author location", "message time", and "related project". Upon receiving form definitions 202, form generation module 112 may generate form 204 to include the specified data fields.

In the example embodiment, MA computer device 102 may generate an interface, such as a web form or web application, for receiving form definitions 202 from admin computer device 114. In one embodiment, MA computer device 102 displays a web application through admin computer device 114 such that a user interacting with admin computer device 114 may define the data that the user wants captured in a new form. In another embodiment, MA computer device 102 generates a user interface that enables a user of admin computer device 114 to create, edit, and/or delete forms or other settings associated with MA computer device 102.

In the example embodiment, form generation module 112 receives form definitions 202 and generates form 204 based on form definitions 202. In another embodiment, MA computer device 102 and/or form generation module 112 generates form 204 without receiving form definitions 202. For example, MA computer device 102 may generate a standardized or default form 204 based on previously received inputs or default settings. In another embodiment, MA computer device 102 receives form 204 from messaging database 126 (shown in FIG. 1). In yet another embodiment, MA computer device 102 and/or form generation module 112 alter a previously existing form based on form definitions 202 in order to create form 204.

In the example embodiment, MA computer device 102 receives messaging data 206 from messaging network 120, and capture module 104 captures messaging data 206 in form 204. In other words, based on the data fields specified in form 204, capture module 104 extracts data from messaging data 206 to fill those data fields. For example, form 204 may specify "author", "recipient", "time sent", and "message text", and capture module 104 may extract data corresponding to those four data fields for each message in messaging data 206 and store it in the form. In alternative embodiments, messaging data 206 may refer to messaging data associated with sent messages, or the sent messages themselves.

In one embodiment, MA computer device 102 receives messaging data 206 from messaging network 120 in real-time or nearly real-time. For example, when a message is sent within messaging network 120 (e.g., between user computer devices 124, shown in FIG. 1), messaging data 206 associated with the sent messages may be received by MA computer device 102 as the message is sent such that capture module 104 updates form 204 with the messaging data in real time. In some embodiments, messages sent over messaging network 120 are also sent to MA computer device 102, such that MA computer device 102 may store the sent messages in form 204.

In another embodiment, MA computer device 102 receives historical messaging data 206 from messaging network 120. For example, messaging data stored in messaging network 120 (e.g., on messaging server 122) may be retrieved by MA computer device 102 for capturing in form 204. In another embodiment, MA computer device 102 receives messaging data 206 from a database, such as messaging database 126 or some other database that is associated with messaging network 120.

In the example embodiment, analytics module 106 is configured to analyze the messaging data stored in form 204, generate message analytics data 208, and store message analytics data 208 in form 204. In alternative embodiments, analytics module 106 performs analysis or calculations on messaging data including, but not limited to: frequency, relative frequency, total, percentage of total, and trends for a number of messages, message content, keywords, user commands, locations, dates, projects, and conversation threads, organized by user, project, date, time, keyword, location, and/or conversation thread, or any combination thereof. In some embodiments, generating messaging analytics data 208 includes, but is not limited to: calculating frequency of messages, such as by date, time, user, and topic: calculating relative frequencies of messages: identifying and analyzing keywords in messages: determining total messages, such as by date, time, user, and topic; and determining relative percentages of messages, among other calculations and analytics. Analytics module 106 is configured to store messaging analytics data 208 in form 204 along with the messaging data captured in form 204.

In one embodiment, specific analysis conducted by analytics module 106 is determined from form definitions 202. In other words, form definitions 202 may specify the inclusion of messaging analytics data fields in form 204, such that once messaging data is captured in form 204, analytics module 106 is configured to automatically determine messaging analytics data 208 based on the specified data fields. For example, form definitions 202 may specify "message text", "author", "date", "total daily message frequency", and "daily message frequency by author". Capture module 104 may capture "message text", "author", and "date" from received messaging data 206 in form 204, and analytics module 106 may automatically calculate "total daily message frequency" and "daily message frequency by author" once the message data is captured in form 204.

In one embodiment, analytics module 106 re-calculates all specified analytics fields any time new message data is captured in form 204. Continuing the above example, analytics module 106 may re-calculate "daily message frequency for all users" and "daily message frequency by author" every time new messaging data is capture in form 204. In another embodiment, analytics module 106 calculates specified analytics upon receiving a signal, such as user input or an update from another module of MA computer device 102. For example, MA computer device 102 may receive a request from admin computer device 114 or user computer device 116 to determine certain messaging analytics that have not yet been calculated and stored in form 204.

In the example embodiment, display module 108 is configured to receive form 204, generate messaging display 210, and store messaging display 210 in form 204, such that messaging display 210 may be viewed on a display screen by a user accessing form 204. In alternative embodiments, messaging display 210 includes, but is not limited to, any chat stream, graphics, visualizations, displays, models, charts, graphs, images, and 2D or 3D representations associated with any data in form 204. In the example embodiment, display module 108 generates messaging display 210 based on at least one of messaging data 206 and messaging analytics data 208. For example, display module 108 may generate a "chat stream" view based on messaging data 206, such that message text is displayed in chronological order with the associated authors' names visible. In another example, display module 108 may utilize messaging analytics data 208 to generate a bar graph illustrating a number of messages sent by a group of users per day.

In one embodiment, display module 108 is configured to generate messaging display 210 based on messaging data 206, such that messaging display 210 allows a user to visualize messaging data 206 in a more convenient way. Specifically, messaging data 206 may be stored in form 204 as tabular data, which may be difficult for a user to comprehend. For example, messaging data 206 may include "message text", "author", "time sent", "recipients", and "conversation thread", where "conversation thread" specifies a conversation among a particular group of users. In its tabular form, messaging data 206 may include messages from multiple conversations threads, thereby making the data difficult for a user to comprehend. Display module 108 is configured to generate a "chat stream" view, or a conversation thread view, such that individual conversations may be viewed by a user, with each message displayed chronologically.

In another embodiment, display module 108 is configured to generate messaging display 210 based on messaging analytics data 208, such that messaging display 210 allows a user to visualize analytics associated with messaging data 206 in form 204. Specifically, display module 108 may allow a user to visualize messaging analytics data 208 to more readily comprehend trends, statistics, and analytics associated with messaging data 206. For example, messaging analytics data 208 may include analytics such as "number of messages sent per user per day", "average number of messages sent per user per day per conversation thread", and "percentage of user texts per conversation thread", and display module 108 may generate multiple charts or graphs that visually represent these analytics. A bar graph for a specific user may include "days" on the X-axis and "number of messages sent" on the Y-axis, such that the graph depicts the number of messages sent per day by the user. A similar bar graph for a specific user may include "conversation threads" on the X-axis and "average number of messages sent per day" on the Y-axis, such that the graph depicts the average number of messages sent per day per conversation thread. A pie chart for a specific user may display "percentage of user texts per conversation thread" as portions of the pie chart. Display module 108 is further configured to store messaging display(s) 210 in form 204 such that each messaging display 210 is easily accessed by a user (e.g., a user may select between tabs, select from a list, etc.)

In one embodiment, messaging analytics data 208 includes a qualitative score associated with messaging data 206. Specifically, MA computer device 102 is configured analyze messaging data 206 and generate a qualitative score associated with some aspect of messaging data 206. In the example embodiment, MA computer device 102 uses a trained machine learning model to interpret the text in messaging data 206 (e.g., using a natural language processing ("NLP") model) and determine qualitative aspects of messaging data 206. In one embodiment, the qualitative score is a sentiment score indicating an overall sentiment (e.g., attitude or emotion) conveyed within messaging data 206. For example, MA computer device 102 may determine that messaging data 206 includes a high percentage of text with negative connotations and generate a sentiment score reflecting a negative sentiment. In alternative embodiments, MA computer device 102 generates a qualitative score (e.g., a sentiment score) based on messaging data 206 organized by any meta-data or data elements associated with messaging data 206. For example, MA computer device 102 may determine a sentiment score for each day, based on the messages sent during that day. In another example, MA computer 102 may further determine a sentiment score each day for each project associated with messaging data 206. Visual depictions of the sentiment score are described in more detail with regard to FIG. 5 below.

In the example embodiment, instructions module 110 is configured to receive form 204, generate operation instructions 212, and transmit operation instructions to an external computer device, such as third party computer device 118 or user computer device 116. Instructions module 110 is further configured to store operation instructions 212 in form 204. Operations instructions 212 may be any code or instructions that may be generated and transmitted by instructions module 110 and that may cause a computer device to take some action or carry out the instructions thereon. Operations instructions 212 may include, but are not limited to, alerts, notifications, recommendations, and instructions for carrying out an action by a computer system. For example, instruction outputs 212 may cause an alert or notification to automatically display on user computer device 116, automatically input an event into a calendar accessed by user computer device 116 or third party computer device 118, update calendar events, automatically place an order for goods/services through third party computer device 118, automatically send an email or other message, place a phone call, and generate or update a project management chart, among other actions.

In the example embodiment, instructions module 110 analyzes data in form 204 and generates instructions outputs 212 based on the analysis. Specifically, instructions module 110 generates instructions outputs 212 based on messaging data 206 and messaging analytics data 208. In one embodiment, instructions module 110 utilizes a trained machine learning model to analyze messaging data 206 and messaging analytics data 208 and generate instructions outputs 212. In alternative embodiments, instructions module 110 generates instructions outputs based on analyzing any combination of messaging data 206, messaging analytics data 208, other data stored in form 204, or any other data that may be useful in generating instructions outputs 212.

In one embodiment, instructions module 110 utilizes a trained machine learning model to analyze keywords (or key phrases) in messaging data 206 and generate instructions outputs 212 based on the keyword analysis. For example, instructions module 110 may determine that multiple messages contain the text "Project Beta", while the messages are associated with Project Alpha according to a project grouping field in messaging data 206. Instructions module 110 may determine that the text "Project Beta" is referenced enough times (e.g., the count meets a threshold), or that the text "Project Beta" is otherwise associated with enough importance that instructions module 110 may generate instructions outputs 212 which send an alert message to certain users indicating that it may be helpful to copy the messages to a Project Beta text thread.

In another embodiment, instructions module 110 utilizes natural language processing ("NLP"), such as via a trained machine learning model, to interpret the text in messaging data 206 and generate instructions outputs 212 based on the interpreted text. For example, messaging data 206 may include messages with the text "we need to order more pens". Instructions module 110 may interpret the text and generate instructions outputs 212 which, when sent to a third part computer system, automatically place an online order for more pens. In another example, messaging data 206 may include messages in a text thread with the text "we should email the rest of our department about this issue". Instructions module 110 may interpret the text and generate instructions outputs 212 which, when sent to a third party email server, automatically generate and transmit an email to users in the same department as the users in the text thread.

Figure 3:
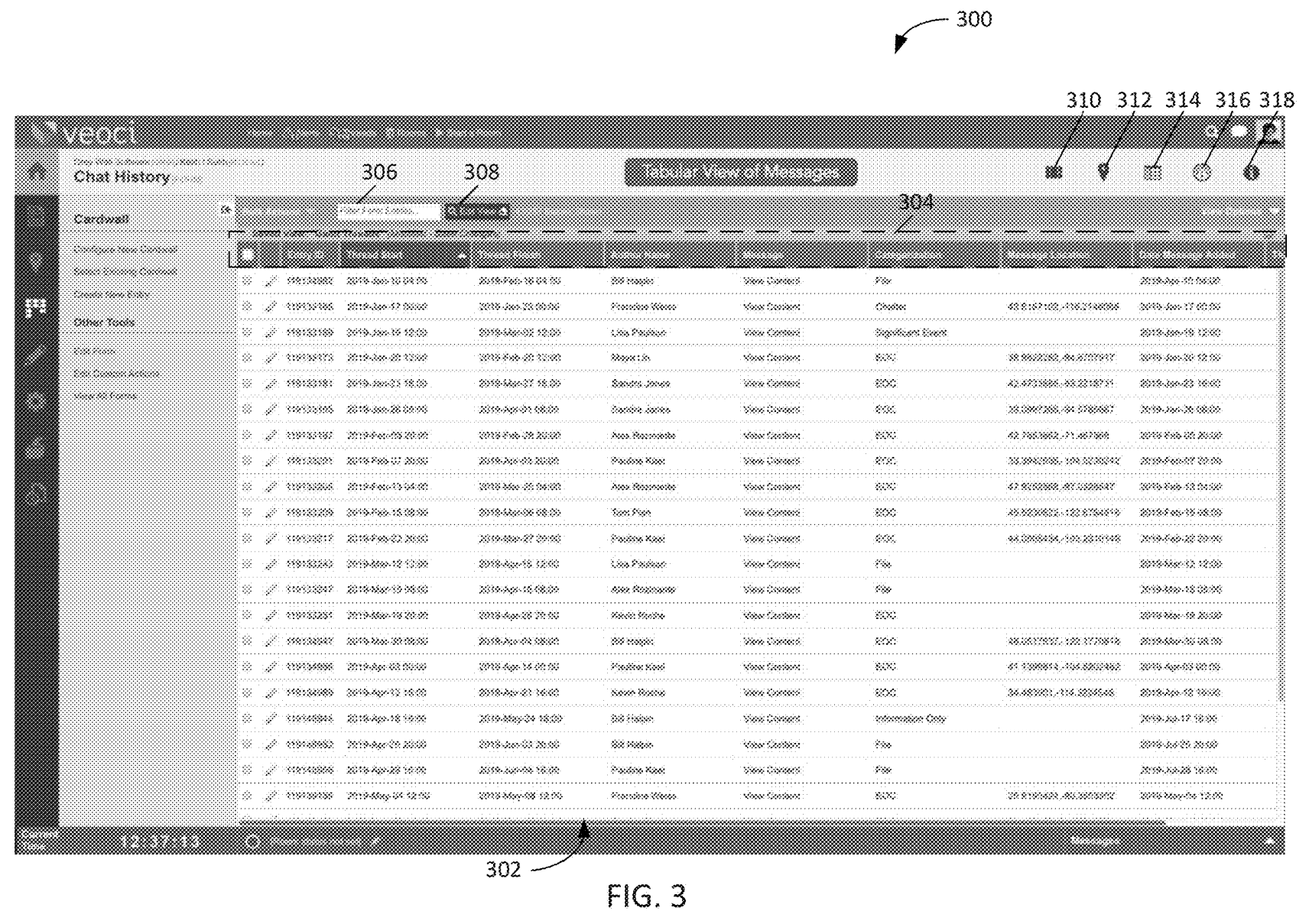

FIG. 3 illustrates a tabular data interface 300 for interacting with a form, such as form 204 (shown in FIG. 2). In the example embodiment, tabular data interface 300 is generated and displayed to a user by MA computing device 102 (shown in FIGS. 1 and 2). Tabular data interface 300 may be displayed on user computer device 116, or any other appropriate user computer device.

In the example embodiment, tabular data interface 300 is configured to display tabular data display 302 and allows a user to interact with tabular data display 302. Tabular data display 302 may be similar to messaging display 210 (shown in FIG. 2). Tabular data display 302 may include messaging data, messaging analytics data, or another kind of data in tabular data form, such that each row represents an individual message and each column specifies elements of the message. Tabular data interface 300 may include columns 304 associated with tabular data display 302. Columns 304 specify attributes of tabular data display 302, such as, but not limited to, "Entry ID", "Thread Start (date)", "Thread Finish (date)", "Author Name", "Message", "Categorization", "Message Location", and "Date Message Added". The data elements specified by columns 304 may be populated for each row of tabular data display 302.

User interface 300 is further configured to display filter bar 306, which allows a user to apply a filter to tabular data 302. In other words, a user may specify a text in filter bar 306, and the text may be used to filter the data (e.g., down to multiple items, one item, or no items). For example, a user may type in the text "John Doe", such that only messages including the text "John Doe" may appear. In one embodiment, user filter bar 306 is configured to enable a plurality of filters applied to tabular data 302. In alternative embodiments, filter bar 306 provides a list of filter options from which a user may select one or more filters to apply to tabular data 302.

User interface 300 is further configured to display edit view option 308. Edit view option 308 is configured to enable a user to select the elements of tabular data 302 to be displayed. In one embodiment, edit view option 308 allows a user to select which columns 304 are displayed for tabular data 302. User interface 300 is further configured to display information option 318, which displays assistance information to a user upon user-selection.

User interface 300 is further configured to display view options such as card wall view 310, map view 312, calendar view 314, Gantt chart view 316. As described with reference to FIGS. 1 and 2, form 204 includes messaging data, messaging analytics data, and messaging display data. User interface 300 allows a user to quickly select multiple view options for viewing data stored in form 204. Specifically, card wall view 310 displays messaging data and/or messaging analytics data in a card wall visual, wherein the cards may be specified based on any of the messaging data and/or messaging analytics data. For example, each card in the card wall may represent an individual conversation thread, such that a user may select and view the conversation thread by selecting the card. In another example, each card in the card wall may relate to projects specified within conversations that were extracted using a trained machine learning model. Card wall view 310 is described in more detail with regard to FIG. 6. In one embodiment, views 310, 312, 314 and 316 are enabled only if data in the form includes data required for the view. For example, map view 312 may not appear and/or may be un-selectable if data in the form does not contain location meta-data associated with messages in the form.

Map view 312 displays messaging data and/or messaging analytics data in a map visual. Specifically, based on location data associated with each message, map view 312 displays messaging data and/or messaging analytics data associated with locations on the map. For example, map view 314 may include a geographical map and a number of messages sent per day from different locations, locations of message authors, locations specified within messages, locations from which a message was sent within a specified period of time, or any other information associated with the location data of messages. Map view 312 is described in more detail with regard to FIG. 4.

Calendar view 314 displays messaging data and/or messaging analytics data in a calendar visual. Specifically, based on dates and/or times associated with each message, calendar view 314 displays messaging data and/or messaging analytics data associated with each date. For example, calendar view 314 may include a number of messages sent by specific groups on each day, a total number of messages sent each day, a total number of times a keyword was mentioned each day, days remaining for a project deadline, or any other messaging data or messaging analytics data displayed on a calendar. Calendar view 314 is described in more detail with regard to FIG. 5.

Figure 4:
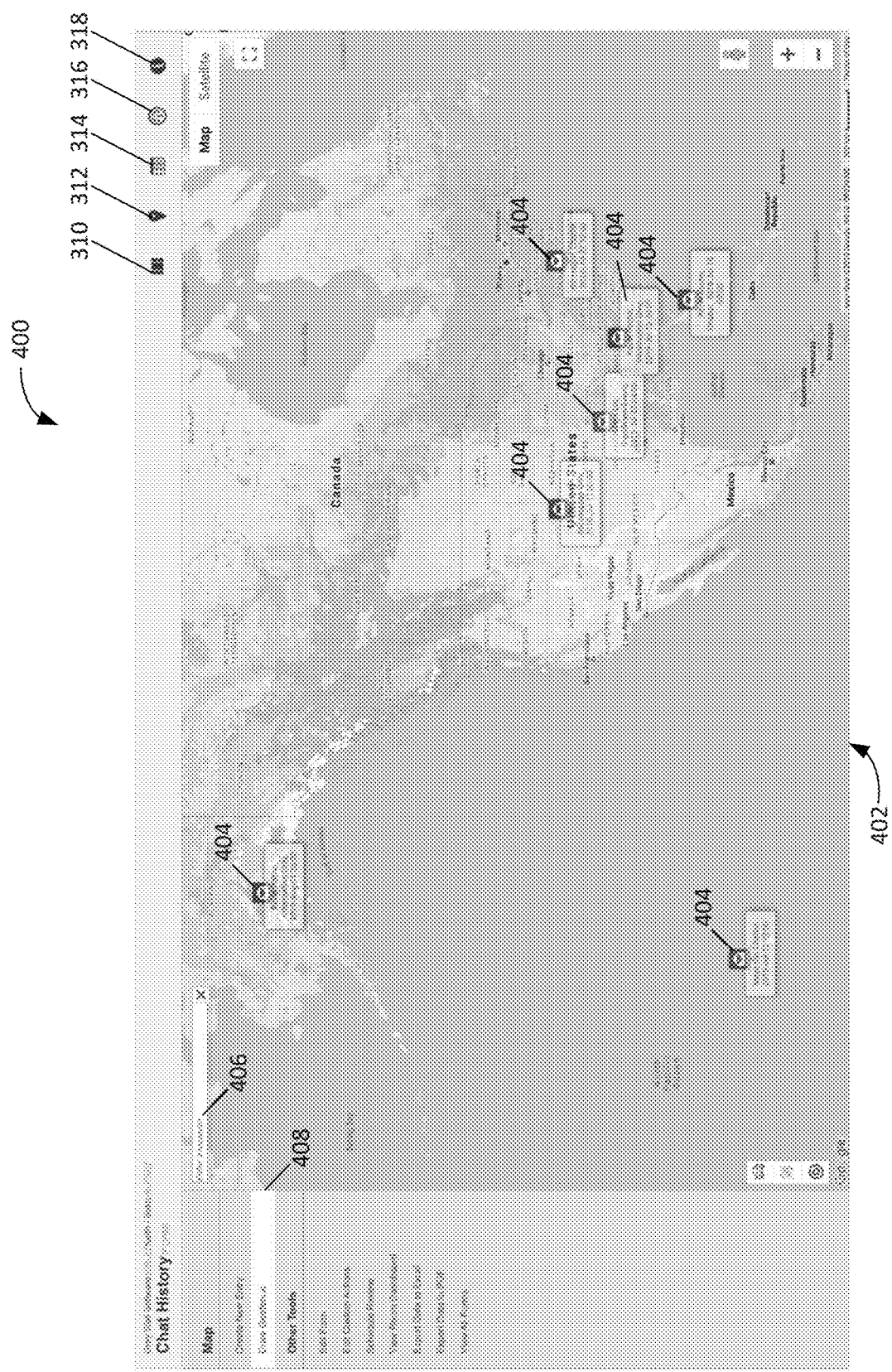

FIG. 4 illustrates a map interface 400 for interacting with a form, such as form 204 (shown in FIG. 2). In the example embodiment, map interface 400 is generated and displayed to a user by MA computing device 102 (shown in FIGS. 1 and 2). Map interface 400 may be displayed on user computer device 116, or any other appropriate user computer device.

In the example embodiment, map interface 400 is configured to display map view 402 along with data icons 404 positioned on map view 402. Map view 402 may be similar to messaging display 210 (shown in FIG. 2). Data icons 404 may be associated with any messaging data, messaging analytics data, or any other data stored within the form on which map interface 400 is based. Map interface 400 is configured to position data icons 404 within map view 402 according to location data associated with data icons 404. In other words, based on geographical location data associated with the messaging data in the form, map interface 400 positions data icons 404 within map view 402. In the example embodiment, selecting one instance of data icons 404 may cause map interface 400 to display additional information related to data icons 404, such as a conversation thread or an author profile.

For example, for a given week, map interface 400 may include data icons 404 including an author's name at every location during that week from which that author sent a message. In another example, for a given time period, map interface 400 may include messaging icons as data icons 404 for every location from which a message associated with a "Project Alpha" conversation thread was sent. In another example, data icons 404 may be positioned within map view 402 based on places mentioned within conversation threads (e.g., a marker is placed on a city when a user mentions that city in a conversation).

In the example embodiment, map interface 400 includes location search bar 406, through which a user is able to search for a specific location. In one embodiment, the user inputs text into location search bar 406 and data icons 404 with a location matching the text are displayed on map view 402. In alternative embodiments, location search bar 406 presents a list of options to the user, which the user can select either one at a time, or input multiple locations at once.

In the example embodiment, map interface 400 includes draw geofence option 408. Draw geofence option 408 is configured to allow a user to draw (e.g., using a cursor or a touch screen) a geofence around a geographical area, such that all data icons 404 within the geographic area is highlighted and/or displayed. In one embodiment, drawing a geofence further causes map view 402 to zoom in on the selected area.

In the example embodiment, map interface 400 further includes tabular data view 310, map view 312, calendar view 314, Gantt chart view 316, and information view 318, which are described in more detail with reference to FIG. 3 above.

Figure 5:
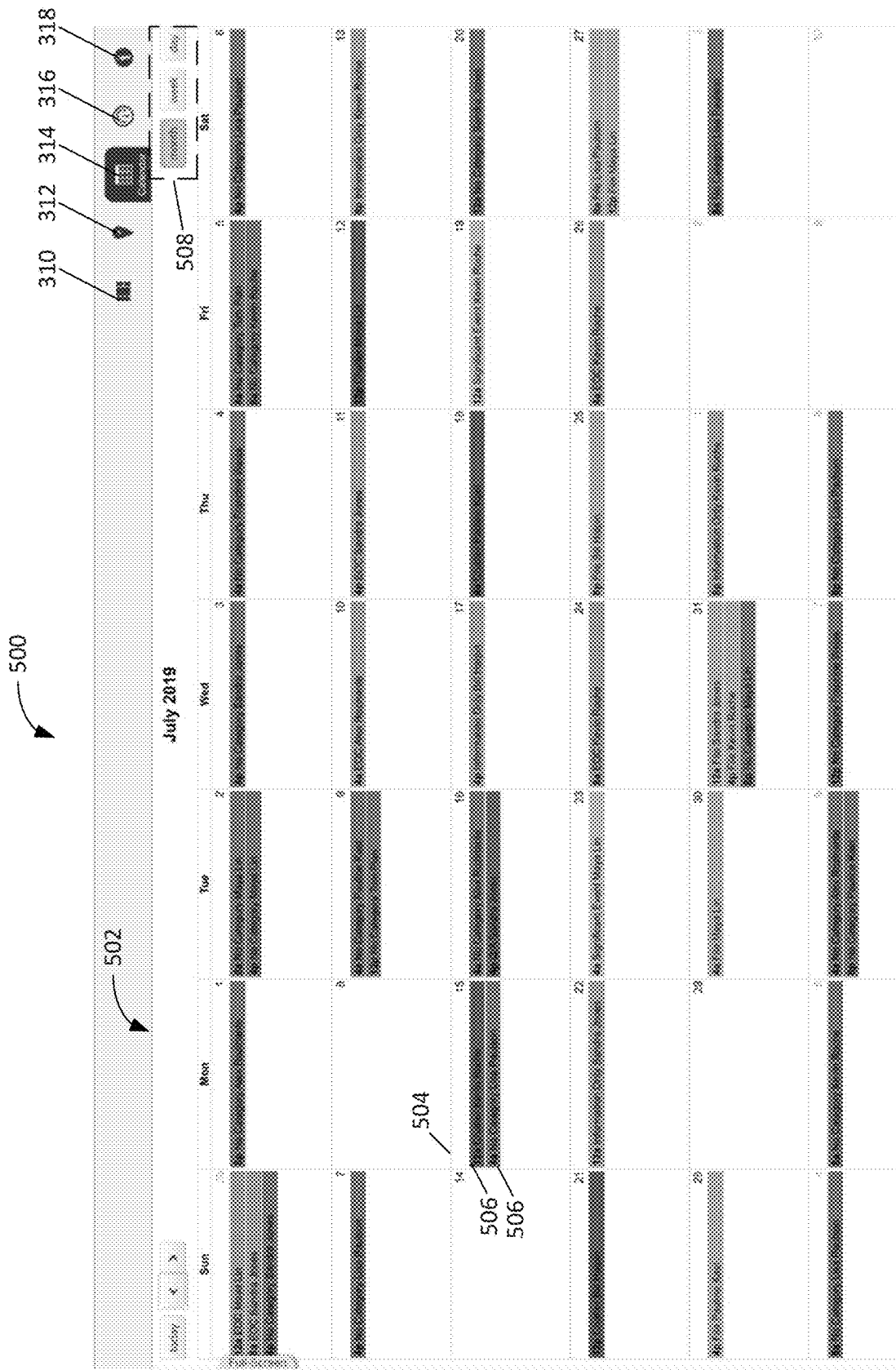

FIG. 5 illustrates a calendar interface 500 for interacting with a form, such as form 204 (shown in FIG. 2). In the example embodiment, calendar interface 500 is generated and displayed to a user by MA computing device 102 (shown in FIGS. 1 and 2). Calendar interface 500 may be displayed on user computer device 116, or any other appropriate user computer device.

In the example embodiment, calendar interface 500 is configured to display calendar display 502 along with calendar entries 506 positioned within calendar days 504. Calendar display 502 may be similar to messaging display 210 (shown in FIG. 2). Calendar entries 506 may be associated with or represent any messaging data, messaging analytics data, or any other data stored within the form on which calendar interface 500 is based. Calendar interface 500 is configured to position calendar entries 506 within calendar days 504 according to time and/or date information associated with calendar entries 506. In other words, based on time and/or date data associated with the messaging data in the form, calendar interface 500 positions calendar entries 506 within calendar days 504. In the example embodiment, selecting one instance of calendar entries 506 may cause calendar interface 500 to display additional information related to calendar entries 506, such as a conversation thread or an author profile.

In the example embodiment, calendar interface 500 includes time increment options 508, which may cause calendar display 502 to display calendar entries 506 within other time increments, such as "month", "week", or "day. In alternative embodiments, calendar interface 500 is configured to display calendar entries 506 within any time increment, such as minutes, hours, days, weeks, months, or years. In one embodiment, specific time increments can be specified by a user.

In one example, calendar interface 500 is associated with a particular project and includes a monthly calendar view and author names are included in each calendar day during which the author sent a message related to the project. In another example, calendar interface 500 displays message text within each day of the calendar, where the message text is related to messages sent by a specific author within a specific conversation thread during that day. In another example, calendar interface 500 displays messaging analytics data such as a total number of messages sent per day for a specific user, where the total number of messages is included in each day of the calendar. In another example, messages sent per day per user for a particular project is included in each day of the calendar.

In another example, calendar interface 500 visually displays an overall sentiment for each day based on a sentiment score determined based on the messaging data collected and analyzed. The visual sentiment displays may include emojis or other images that convey a particular emotion, and/or color coded text, numbers, or fills that indicate an emotional sentiment. For example, calendar interface 500 may display a smiley face emoji for each day in which a sentiment score is above a certain threshold (e.g., indicates an overall positive sentiment for the day) and a frowny face emoji for each day in which a sentiment score is below a certain threshold (e.g., indicates an overall negative sentiment for the day). In alternative embodiments, sentiment scores may be calculated and displayed for multiple projects within a particular day, such that each calendar day may include multiple sentiment visualizations, each sentiment visualization associated with a different project.

In the example embodiment, calendar interface 500 further includes tabular data view 310, map view 312, calendar view 314, Gantt chart view 316, and information view 318, which are described in more detail with reference to FIG. 3 above.

Figure 6:
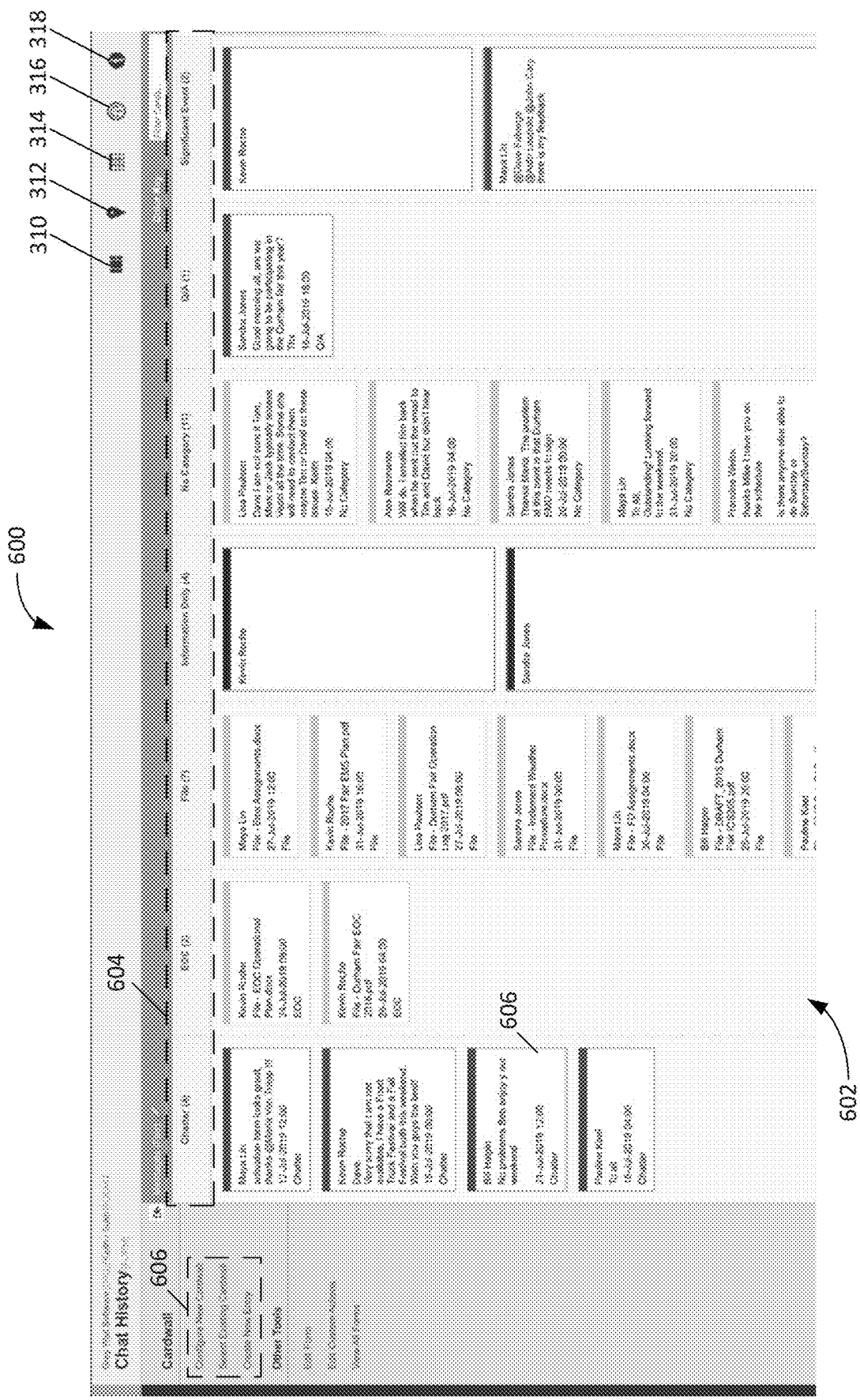

FIG. 6 illustrates a card wall interface 600 for interacting with a form, such as form 204 (shown in FIG. 2). In the example embodiment, card wall interface 600 is generated and displayed to a user by MA computing device 102 (shown in FIGS. 1 and 2). In some embodiments, card wall interface 600 is displayed on user computer device 116, or any other appropriate user computer device.

In the example embodiment, card wall interface 600 is configured to display card wall display 602 to include form data as cards 606 within a card wall. Card wall display 602 may be similar to messaging display 210 (shown in FIG. 2). Card wall display 602 includes cards 606 positioned within card categories 604. Card categories 604 are similar to column headers that group cards 606 by a common attribute. For example, card categories 604 may specify particular projects, and cards 606 are populated beneath card categories 604 according to the category associated with each card 606. In other embodiments, card categories 604 may be any element of messaging data or messaging analytics data as described herein, such as, but not limited to, author, date, time, project, conversation thread, and location.

In the example embodiment, cards 606 are based on form data that includes any of messaging data, messaging analytics data, or any other data stored within the form on which card wall interface 600 is based. Card wall interface 600 is configured to generate cards 606 based on the form data and position cards 606 within card wall display 602 according to card categories 604. In the example embodiment, selecting a card 606 may cause card wall interface 600 to display additional information related to the form data within card 606, such as a conversation thread or an author profile.

In one example, card categories 604 are related to specific projects, and each card 606 contains all the messages for a particular author who has sent messages related to the project specified by card category 604. In another example, card categories 604 indicate conversation threads and each card 606 includes message text for a message associated with each conversation thread. In another example, card wall interface 600 includes messaging analytics data, such as a number of messages sent per day per user for a given project denoted by card category 604. In another example, card categories 604 are projects determined by a trained machine learning model based on an analysis of the form data. The trained machine learning model may determine, based on keywords and text analysis, projects that require action, and determine card categories 604 based on the pending projects. The trained machine learning model may further generate cards 606 based on completed and/or incomplete actions related to the project.

In the example embodiment, card wall interface 600 includes card wall options 606, through which a user is able to edit, modify, create, or delete card walls or elements thereof. In one embodiment, card wall options 606 include "Configure New Cardwall", "Select Existing Cardwall", and "Create New Entry". In alternative embodiments, card wall options 606 may include any options that enable a user to interact with, modify, create, or delete card walls and elements thereof.

In one embodiment, card wall interface 600 may include multiple card wall displays 602, where each card wall display 602 is associated with a new project, user, categorization, or some other means for organizing messaging data. Card wall interface 600 may further include tabs or arrows for easily selecting between card wall displays 602. In an example embodiment, card wall interface 600 is configured for display and interaction via a virtual reality or augmented reality computer device. For example, a user may select cards, swipe between card wall displays 602, and otherwise manipulate elements of card wall interface 600 via virtual reality and/or augmented reality inputs.

In the example embodiment, card wall interface 600 further includes tabular data view 310, map view 312, calendar view 314, Gantt chart view 316, and information view 318, which are described in more detail with reference to FIG. 3 above.

Figure 7:
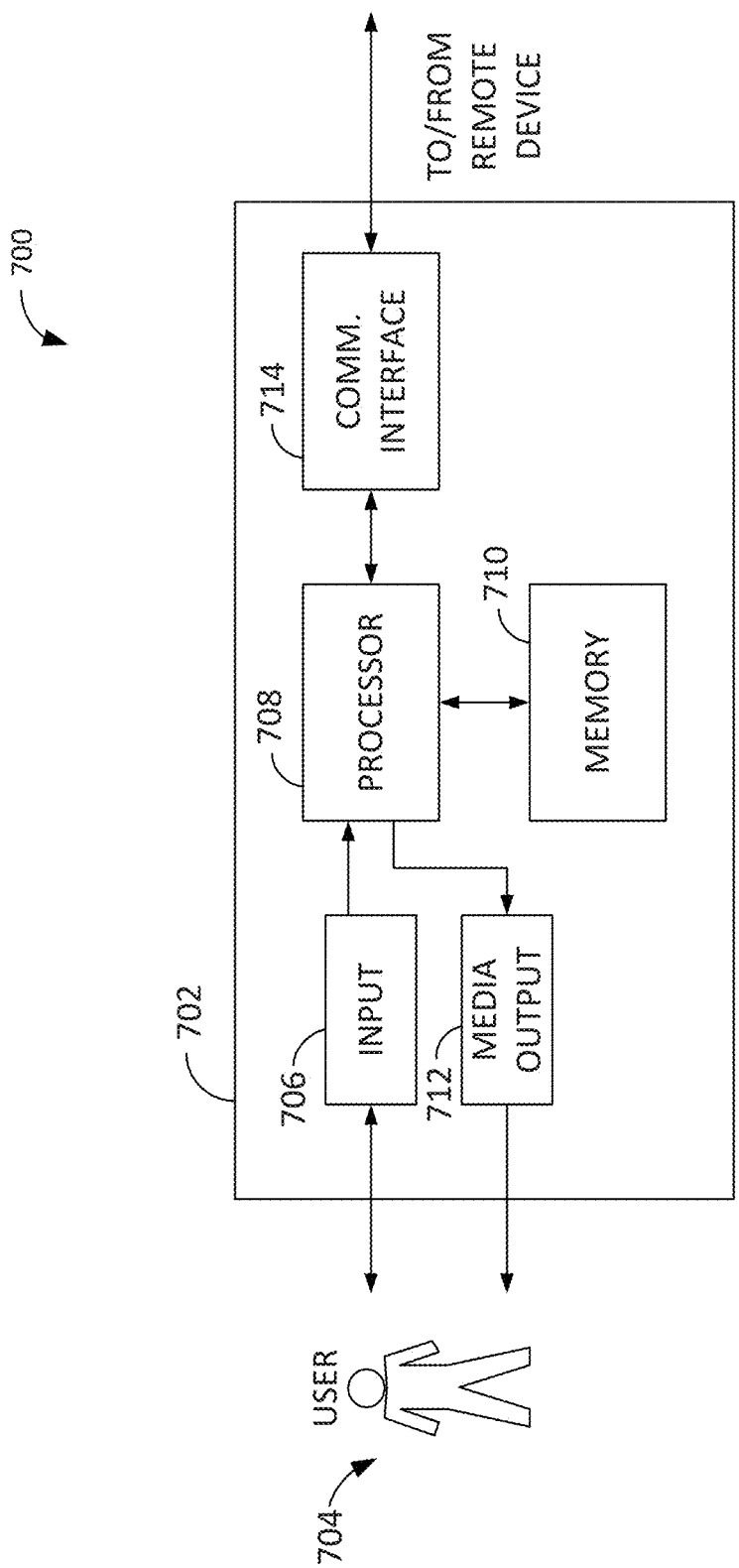

FIG. 7 illustrates an example configuration 700 of an example user computing device 702, such as user computing device 114 and/or admin computer device 114 (shown in FIG. 1). In some embodiments, user computing device 702 is in communication with messaging analytics ("MA") computing device, such as MA computing device 102 (shown in FIG. 1). User computing device 702 may be representative of, but is not limited to user computing device 114 and admin computing device 112. For example, user computing device 702 may be a smartphone, tablet, smartwatch, wearable electronic, laptop, desktop, vehicle computing device, or another type of computing device associated with the account holder.

User computing device 702 may be operated by a user 704 (e.g., a user of messaging analytics ("MA") system 100, shown in FIG. 1). User computing device 702 may receive input from user 704 via an input device 706. User computing device 702 includes a processor 708 for executing instructions. In some embodiments, executable instructions may be stored in a memory area 710. Processor 708 may include one or more processing units (e.g., in a multi-core configuration). Memory area 710 may be any device allowing information such as executable instructions and/or transaction data to be stored and retrieved. Memory area 710 may include one or more computer-readable media.

User computing device 702 also may include at least one media output component 712 for presenting information to user 704. Media output component 712 may be any component capable of conveying information to user 704. In some embodiments, media output component 712 may include an output adapter (not shown), such as a video adapter and/or an audio adapter. An output adapter may be operatively coupled to processor 708 and operatively coupleable to an output device, such as a display device (e.g., a cathode ray tube (CRT), liquid crystal display (LCD), light emitting diode (LED) display, or "electronic ink" display), an audio output device (e.g., a speaker or headphones), and/or a virtual reality or augmented reality device. In some embodiments, media output component 712 may be configured to present a graphical user interface (e.g., a web browser and/or a client application) to user 704.

In some embodiments, user computing device 702 may include input device 706 for receiving input from user 704. User 704 may use input device 706 to, without limitation, interact with MA computing system 100 (e.g., using an app), MA computing device 102, or any of messaging network 120, admin computer device 114, user computer device 116, and third party computer device 118 (shown in FIG. 1). Input device 706 may include, for example, a keyboard, a pointing device, a mouse, a stylus, a touch sensitive panel (e.g., a touch pad or a touch screen), and/or a virtual reality or augmented reality device. A single component, such as a touch screen, may function as both an output device of media output component 712 and input device 706. User computing device 702 may further include at least one sensor, including, for example, an audio input device, a video input device, a gyroscope, an accelerometer, a position detector, a biometric input device, and/or a telematics data collection device. In some embodiments, at least some data collected by user computing device 702 may be transmitted to MA computing device 102.

User computing device 702 may also include a communication interface 714, communicatively coupled to any of MA computing device 102, messaging network 120, admin computer device 114, user computer device 116, and third party computer device 118. Communication interface 714 may include, for example, a wired or wireless network adapter and/or a wireless data transceiver for use with a mobile telecommunications network.

Stored in memory area 710 may be, for example, computer-readable instructions for providing a user interface to user 704 via media output component 712 and, optionally, receiving and processing input from input device 706. The user interface may include, among other possibilities, a web browser and/or a client application. Web browsers enable users, such as user 704, to display and interact with media and other information typically embedded on a web page or a website hosted by MA computing device 102 and/or user computing device 702. A client application may allow user 704 to interact with, for example, any of MA computing device 102, messaging network 120, admin computer device 114, user computer device 116, and third party computer device 118. For example, instructions may be stored by a cloud service and the output of the execution of the instructions sent to the media output component 712.

Figure 8:
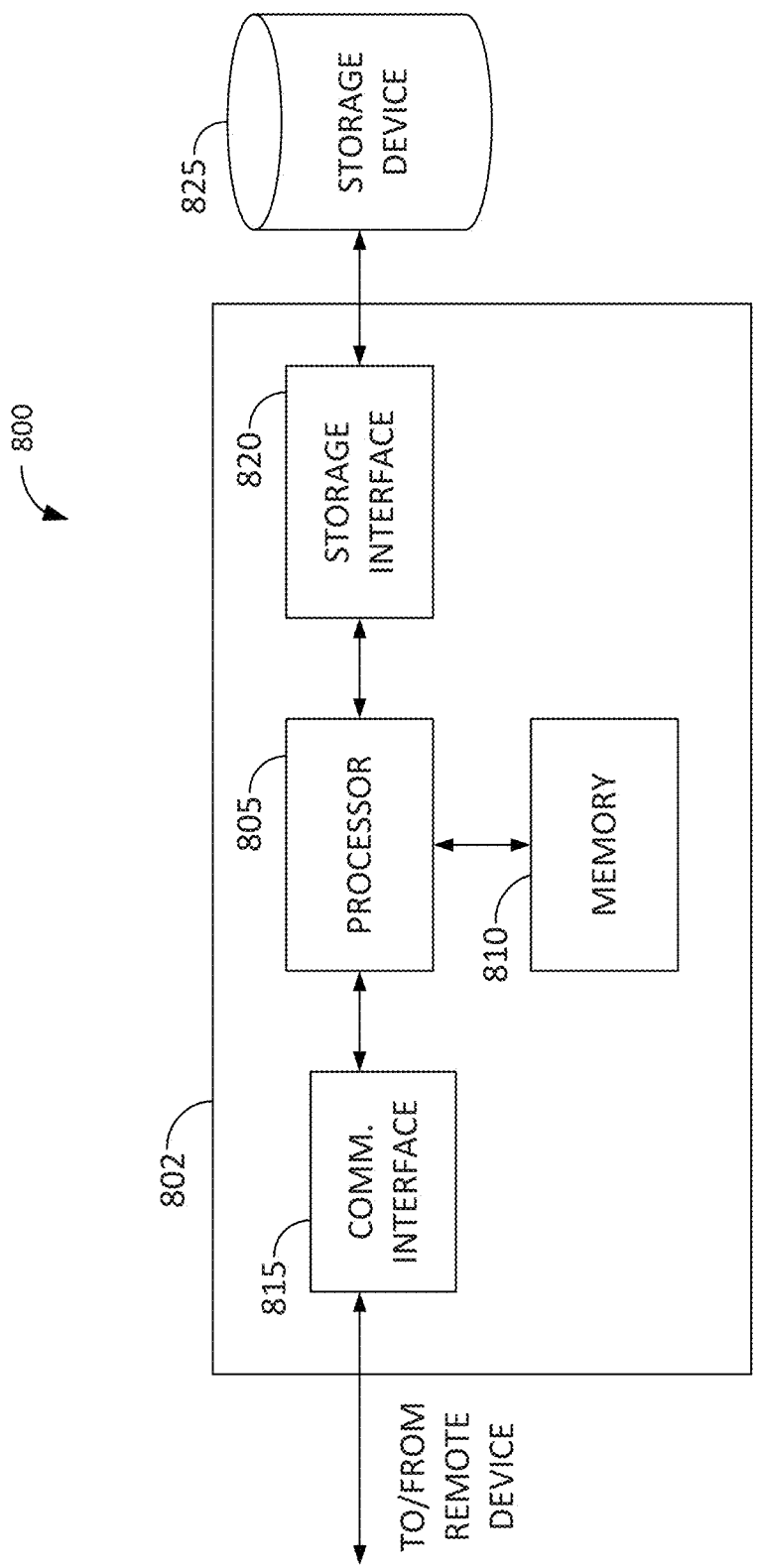

FIG. 8 depicts an example configuration 800 of an example server computing device 802, in accordance with one embodiment of the present disclosure. Server computer device 802 may include, but is not limited to, MA computing device 102 (shown in FIG. 1). Server computer device 802 may include a processor 805 for executing instructions. Instructions may be stored in a memory area 810. Processor 805 may include one or more processing units (e.g., in a multi-core configuration).

Processor 805 may be operatively coupled to a communication interface 815 such that server computer device 802 may be capable of communicating with a remote device such as another server computer device 802 or a user computing device, such as user computing device 702 (shown in FIG. 7). For example, communication interface 815 may receive requests from or transmit requests to user computing device 702 via the Internet.

Processor 805 may also be operatively coupled to a storage device 825. Storage device 825 may be any computer-operated hardware suitable for storing and/or retrieving data, such as, but not limited to, data associated with messaging database 126 (shown in FIG. 1). In some embodiments, storage device 825 may be integrated in server computer device 802. For example, server computer device 802 may include one or more hard disk drives as storage device 825. In other embodiments, storage device 825 may be external to server computer device 802 and may be accessed by a plurality of server computer devices 802. For example, storage device 825 may include a storage area network (SAN), a network attached storage (NAS) system, and/or multiple storage units such as hard disks and/or solid state disks in a redundant array of inexpensive disks (RAID) configuration.

In some embodiments, processor 805 may be operatively coupled to storage device 825 via a storage interface 820. Storage interface 820 may be any component capable of providing processor 805 with access to storage device 825. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 825.

Processor 805 executes computer-executable instructions for implementing aspects of the disclosure. In some embodiments, processor 805 may be transformed into a special purpose microprocessor by executing computer-executable instructions or by otherwise being programmed.

Figure 9:
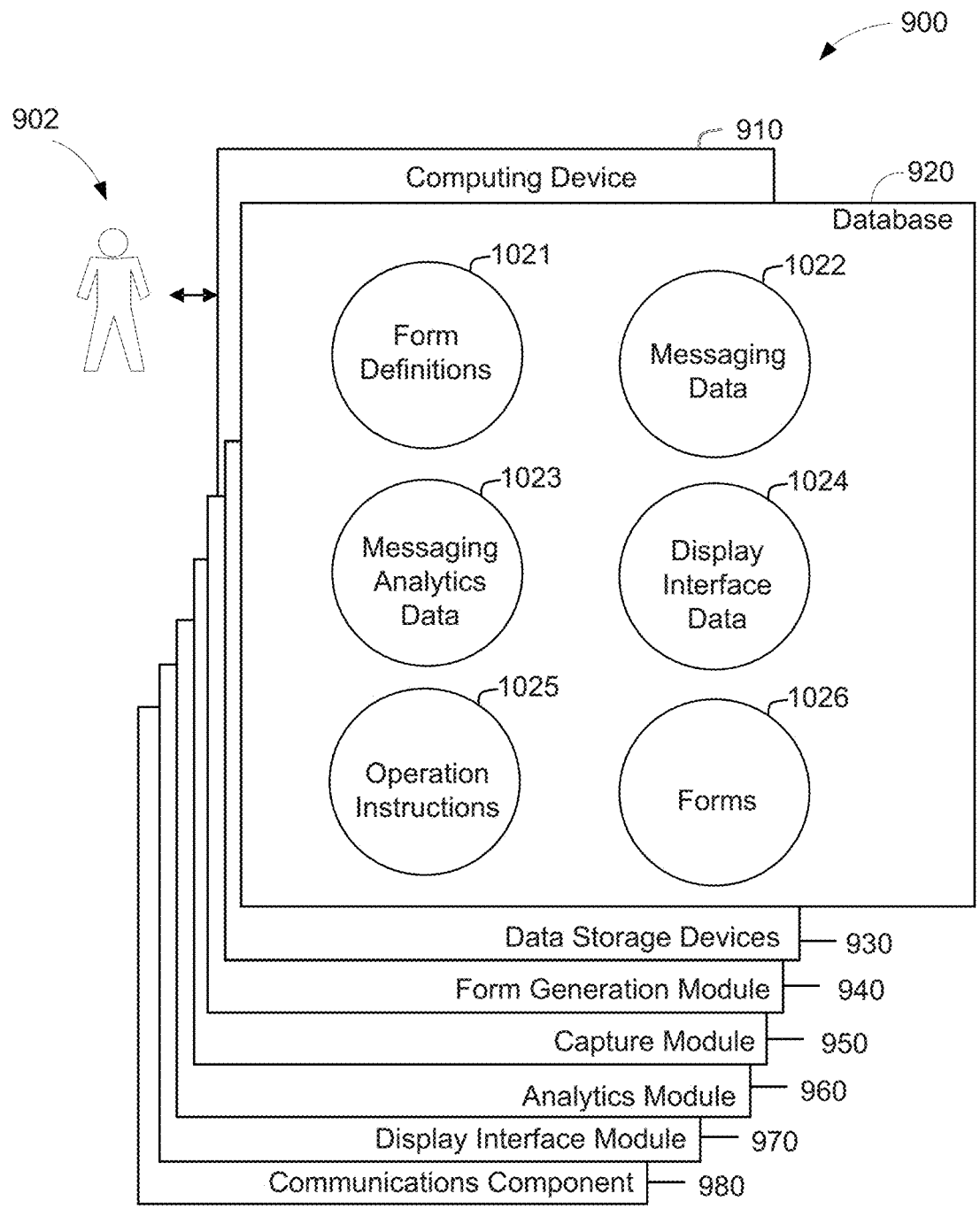

FIG. 9 depicts a diagram 900 of components of one or more example computing devices 910 that may be used in a messaging analytics system, such as messaging analytics ("MA") computer system 100 (shown in FIG. 1). In some embodiments, computing device 910 may be similar to MA computing device 102 (shown in FIG. 1). Database 920 may be coupled with several separate components within computing device 910, which perform specific tasks. In the present embodiment, database 920 may include form definitions 1021, messaging data 1022, messaging analytics data 1023, display interface data 1024, operation instructions 1025, and forms 1026. In some embodiments, database 920 is similar to automation database 122 (shown in FIG. 1).

Computing device 910 may include the database 920, as well as data storage devices 930, which may be used, for example, for storing data, such any of the data mentioned herein, locally. Computing device 910 may also include form generation module 940, capture module 950, analytics module 960, display interface module 970, and communications component 980, which may be utilized to implement the functionalities of an MA computer device as described herein.

Figure 10:
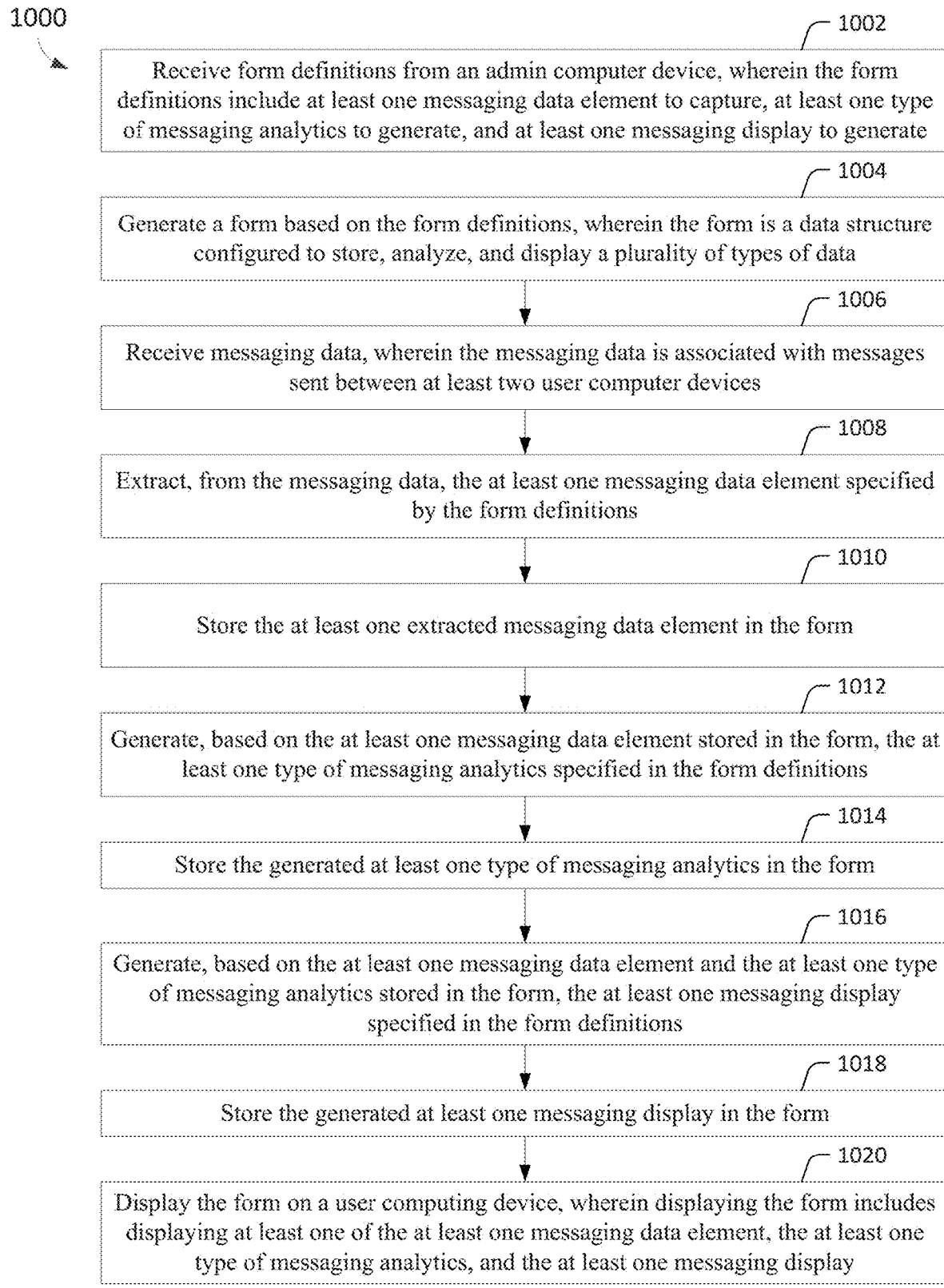

FIG. 10 depicts a flow chart illustrating an example computer-implemented method 1000 for capturing and analyzing message data in a form.

The method includes receiving 1002, by the processor, form definitions from an admin computer device, wherein the form definitions include at least one messaging data element to capture, at least one type of messaging analytics to generate, and at least one messaging display to generate: generating 1004, by the processor, a form based on the form definitions, wherein the form is a data structure configured to store, analyze, and display a plurality of types of data: receiving 1006, by the processor, messaging data, wherein the messaging data is associated with messages sent between at least two user computer devices: extracting 1008, by the processor from the messaging data, the at least one messaging data element specified by the form definitions: storing 1010, by the processor, the at least one extracted messaging data element in the form: generating 1012, by the processor based on the at least one messaging data element stored in the form, the at least one type of messaging analytics specified in the form definitions: storing 1014, by the processor, the generated at least one type of messaging analytics in the form: generating 1016, by the processor based on the at least one messaging data element and the at least one type of messaging analytics stored in the form, the at least one messaging display specified in the form definitions: storing 1018, by the processor, the generated at least one messaging display in the form; and displaying 1020, by the processor, the form on a user computing device, wherein displaying the form includes displaying at least one of the at least one messaging data element, the at least one type of messaging analytics, and the at least one messaging display.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the MA computer device are described herein as including general processing and memory devices, it should be understood that the MA computer device is a specialized computer configured to perform the steps described herein for capturing, analyzing, and displaying messaging data.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A messaging analytics system for automatically capturing, analyzing, and displaying messaging data, the messaging analytics system comprising at least one processor in communication with at least one memory device, wherein the at least one processor is programmed to:
   receive form definitions from an admin user via an admin computer device, wherein the form definitions include at least one messaging data element to capture, at least one type of messaging analytics to generate, and at least one messaging display to generate;
   generate a form based on the form definitions, wherein the form is a data structure configured to store, analyze, and display a plurality of types of data;

receive messaging data, wherein the messaging data is associated with messages sent between at least two user computer devices;

extract, from the messaging data, the at least one messaging data element specified by the form definitions;

store the at least one extracted messaging data element in the form;

generate, based on the at least one messaging data element stored in the form, the at least one type of messaging analytics specified in the form definitions;

store the generated at least one type of messaging analytics in the form;

generate, based on the at least one messaging data element and the at least one type of messaging analytics stored in the form, the at least one messaging display specified in the form definitions;

store the generated at least one messaging display in the form; and in response to author location analytics being included in the at least one type of messaging analytics specified in the form definitions, determine a plurality of messages from a plurality of users associated with a first conversation thread; and display a graph comprising a plurality of geographic location data for each message of the plurality of messages associated with the first conversation thread, wherein the geographic location data of each message of the plurality of messages from each user of the plurality of users includes the location of the corresponding computer device at the time the corresponding message was sent.

2. The messaging analytics system of claim 1, wherein the messaging display is at least one of a chat stream view, a calendar view, a map view, a card wall view, and a Gantt chart view.

3. The messaging analytics system of claim 1, wherein the at least one processor is further programmed to:

analyze the messaging data using a trained machine learning model;

identify at least one keyword in the messaging data based on the analysis; and generate, based on the at least one identified keyword, operations instructions comprising computer executable instructions, such that the operations instructions, when transmitted to a third party computer device, cause the third party computer device to implement an action external to the messages sent between at least two user computer devices; and transmit the operations instructions to the third party computer device.

4. The messaging analytics system of claim 3, wherein the third party computer device is a computer device associated with an email system, and the operations instructions cause the third party computer device to send at least one email containing data associated with the messaging data.

5. The messaging analytics system of claim 3, wherein the third party computer device is a computer device associated with an online merchant, and the operations instructions cause the third party computer device to place an order for a product without a user directly interacting with the third party computer device.

6. The messaging analytics system of claim 3, wherein the third party computer device is a first user computer device of the at least two user computer devices, and the operations instructions cause an alert notification to display on the first user computer device.

7. The messaging analytics system of claim 3, wherein the processor is further configured to:

analyze the messaging data using natural language processing;

assign meaning to at least one text phrase based on the analysis using natural language processing; and generate additional operations instructions for the action external to the messages sent between at least two user computer devices based on the assigned meaning.

8. The messaging analytics system of claim 1, wherein the at least one processor is further programmed to display a graph comprising a plurality of geographic location data for each message of a plurality of messages from a first user of a plurality of users in a period of time, wherein the location data of each message of the plurality of messages from the first user of the plurality of users includes the location of the corresponding computer device at the time the corresponding message was sent.

9. The messaging analytics system of claim 1, wherein the at least one processor is further programmed to:

receive, from a user, a geofence of a selection of a geographic area; and display a graph comprising a plurality of geographic location data for each message of a plurality of messages from a plurality of users located within the geofence, wherein the location data of each message of the plurality of messages from each user of the plurality of users includes the location of the corresponding computer device at the time the corresponding message was sent.

10. A computer-implemented method for automatically capturing, analyzing, and displaying messaging data, the method implemented by a computer system including at least one processor, the method comprising:

receiving, by the processor, form definitions from an admin user via an admin computer device, wherein the form definitions include at least one messaging data element to capture, at least one type of messaging analytics to generate, and at least one messaging display to generate;

generating, by the processor, a form based on the form definitions, wherein the form is a data structure configured to store, analyze, and display a plurality of types of data;

receiving, by the processor, messaging data, wherein the messaging data is associated with messages sent between at least two user computer devices;

extracting, by the processor from the messaging data, the at least one messaging data element specified by the form definitions;

storing, by the processor, the at least one extracted messaging data element in the form;

generating, by the processor based on the at least one messaging data element stored in the form, the at least one type of messaging analytics specified in the form definitions;

storing, by the processor, the generated at least one type of messaging analytics in the form;

generating, by the processor based on the at least one messaging data element and the at least one type of messaging analytics stored in the form, the at least one messaging display specified in the form definitions;

storing, by the processor, the generated at least one messaging display in the form; and in response to author location analytics being included in the at least one type of messaging analytics specified in the form definitions, determining a plurality of messages from a plurality of users associated with a first conversation thread; and displaying, by the processor, a graph comprising a plurality of geographic location data for each message of the plurality of messages associated with the first conversation thread, wherein the geographic location data of each message of the plurality of messages from each user of the plurality of users includes the location of the corresponding computer device at the time the corresponding message was sent.

11. The method of claim 10, wherein the messaging display is at least one of a chat stream view, a calendar view, a map view, a card wall view, and a Gantt chart view.

12. The method of claim 10, further comprising:
analyzing the messaging data using a trained machine learning model;
identifying at least one keyword in the messaging data based on the analysis;
generating, based on the at least one identified keyword, operations instructions comprising computer executable instructions, such that the operations instructions, when transmitted to a third party computer device, cause the third party computer device to implement an action external to the messages sent between at least two user computer devices; and
transmitting the operations instructions to the third party computer device.

13. The method of claim 12, wherein the third party computer device is a computer device associated with an email system, and the operations instructions cause the third party computer device to send at least one email containing data associated with the messaging data.

14. The method of claim 12, wherein the third party computer device is a computer device associated with an online merchant, and the operations instructions cause the third party computer device to place an order for a product without a user directly interacting with the third party computer device.

15. The method of claim 12, wherein the third party computer device is a first user computer device of the at least two user computer devices, and the operations instructions cause an alert notification to display on the first user computer device.

16. The method of claim 12, wherein the processor is further configured to:
analyzing the messaging data using natural language processing;
assigning meaning to at least one text phrase based on the analysis using natural language processing; and
generating additional operations instructions for the action external to the messages sent between at least two user computer devices based on the assigned meaning.

17. At least one non-transitory computer-readable storage media having computer-executable instructions embodied thereon for automatically capturing, analyzing, and displaying messaging data, wherein when executed by at least one processor, the computer-executable instructions cause the processor to:
receive form definitions from an admin user via an admin computer device, wherein the form definitions include at least one messaging data element to capture, at least one type of messaging analytics to generate, and at least one messaging display to generate;
generate a form based on the form definitions, wherein the form is a data structure configured to store, analyze, and display a plurality of types of data;
receive messaging data, wherein the messaging data is associated with messages sent between at least two user computer devices;
extract, from the messaging data, the at least one messaging data element specified by the form definitions;
store the at least one extracted messaging data element in the form;
generate, based on the at least one messaging data element stored in the form, the at least one type of messaging analytics specified in the form definitions;
store the generated at least one type of messaging analytics in the form;
generate, based on the at least one messaging data element and the at least one type of messaging analytics stored in the form, the at least one messaging display specified in the form definitions;
store the generated at least one messaging display in the form; and
in response to author location analytics being included in the at least one type of messaging analytics specified in the form definitions,
determine a plurality of messages from a plurality of users associated with a first conversation thread; and
display a graph comprising a plurality of geographic location data for each message of the plurality of messages associated with the first conversation thread, wherein the geographic location data of each message of the plurality of messages from each user of the plurality of users includes the location of the corresponding computer device at the time the corresponding message was sent.

18. The computer-readable storage media of claim 17, wherein the messaging display is at least one of a chat stream view, a calendar view, a map view, a card wall view, and a Gantt chart view.

19. The computer-readable storage media of claim 17, wherein the at least one processor is further programmed to:
analyze the messaging data using a trained machine learning model;
identify at least one keyword in the messaging data based on the analysis; and
generate, based on the at least one identified keyword, operations instructions comprising computer executable instructions, such that the operations instructions, when transmitted to a third party computer device, cause the third party computer device to implement an action external to the messages sent between at least two user computer devices; and
transmit the operations instructions to the third party computer device.

20. The computer-readable storage media of claim 19, wherein the third party computer device is a computer device associated with an email system, and the operations instructions cause the third party computer device to send at least one email containing data associated with the messaging data.

* * * * *